United States Patent [19]

Amey

[11] Patent Number: 5,110,878
[45] Date of Patent: May 5, 1992

[54] DRY POLYAMIDE-EPICHLOROHYDRIN RESIN POWER FOR STRENGTHENING WET PAPER

[75] Inventor: Ronald L. Amey, Wilmington, Del.

[73] Assignee: E. I. Du Pont de Nemours and Company, Wilmington, Del.

[21] Appl. No.: 698,993

[22] Filed: May 14, 1991

[51] Int. Cl.⁵ .................................................. C08G 69/48
[52] U.S. Cl. .................................... 525/430; 528/342; 528/481
[58] Field of Search ................. 525/430; 528/342, 481

[56] References Cited

U.S. PATENT DOCUMENTS 4,861,815  8/1989  Schultz et al. .................... 525/430
5,039,758  8/1991  Tobita et al. ..................... 525/430

Primary Examiner—Harold D. Anderson

[57] ABSTRACT

Dry polyamide-epichlorohyrin resin powder that is useful to increase the wet strength of paper is prepared by freeze-drying.

4 Claims, No Drawings

DRY POLYAMIDE-EPICHLOROHYDRIN RESIN POWER FOR STRENGTHENING WET PAPER

FIELD OF THE INVENTION

This invention relates to a dry form of paper strengthening resin, especially useful for giving greater strength to wet paper.

BACKGROUND OF THE INVENTION

Paper strengthening resins are sold commercially as aqueous solutions. Commonly such resins are thermosetting, polymeric reaction products of epichlorohydrin and a polyamide derived from a polyalkylene polyamine and certain dicarboxylic acids. U.S. Pat. No. 2,926,154 to Keim describes aqueous solutions of such resins. Typically aqueous solutions of such resins contain an amine curing accelerator such as ethylenediamine or diethylenetriamine. Such compositions are disclosed in Espy U.S. Pat. No. 3,442,754. The presence of the accelerator makes it possible to thermally set the resin in a shorter time.

Commercially such aqueous solutions usually contain about 10 to 35% by weight resin. Most of the remaining portion of the solution is water. Because such solutions. Such aqueous solutions have a limited shelf-life.

It is an object of the present invention to provide a dry form of paper strengthening resin that may be shipped in this form, and dissolved at the site where it is to be used. Such dry compositions have a very long shelf-life.

SUMMARY OF THE INVENTION

The present invention is a dry, solid, water soluble, amorphous, cationic polyamide-epichlorohydrin resin powder, the polyamide portion of said resin being the long chain reaction product of a polyalkylene polyamine having two primary amine groups and at least one secondary amine group with a member selected from the group consisting of $C_3$ to $C_8$ saturated aliphatic dicarboxylic acids and lower alkyl esters of $C_3$ to $C_8$ saturated aliphatic dicarboxylic acids, said resin having been made by the reaction of said polyamide with epichlorohydrin in an aqueous solution in which the mole ratio of epichlorohydrin to secondary amine groups of the polyamide is about 0.5 to 1 to about 1.8 to 1.

The preferred resin powder of the invention contains diethylenetriamine units and units of adipic acid or glutaric acid.

The resin powder of the invention is preferably produced by freeze-drying an aqueous solution of the resin.

The resin powder of the invention should be stored in moisture impermeable containers, for it adsorbs water from the atmosphere. It is convenient to store and ship the resin powder in water impermeable containers of such a size that the entire contents are used at one time.

When it is decided to use the resin powder of the invention it is dissolved in water. Other additives such as curing accelerators and buffering agents, may be added at the time the resin powder is dissolved.

DETAILED DESCRIPTION

The process for forming the starting material for the present invention, i.e. the aqueous solution of polyamide-epichlorohydrin, is well-known and is described in Keim U.S. Pat. No. 2,926,154. As pointed out in this patent the polyamide portion of the resin is the reaction product of a polyalkylene polyamine having two primary amine groups and at least one secondary amine group with a saturated aliphatic dicarboxylic acid. Suitable polyamines include polyethylene polyamine, polypropylene polyamine, polybutylene polyamine, etc. Suitable saturated aliphatic diacids are preferably those containing 3 to 6 carbon atoms, for example, malonic, succinic, glutaric and adipic.

The Keim patent also teaches the reaction conditions, and the various concentration of ingredients.

The process of freeze-drying the aqueous solution of polyamide-epichlorohydrin usually consists of four general steps: 1) freezing the resin solution at a temperature below the eutectic point; 2) primary drying by high vacuum sublimation with concomitant heat input, 3) secondary drying by high vacuum desorption to reduce the water content to less than 1% by weight; 4) packaging the resin under anhydrous conditions. Suitable equipment for freeze-drying is described in *Fundamentals of Freeze-Drying*, J. D. Mellor, Academic Press, New York (1978) and *Downstream Processes: Equipment and Techniques*, J. W. Snowman, Vol. 8, pages 315–351, A. R. Liss, New York (1988).

The freeze-drying of the aqueous resin solution may be carried out on solutions containing from 1 to 99% by weight resin, however, it is preferred that the resin concentration be about 10 to 75%, and most preferably 60 to 75%.

The freeze-drying process, also called lyophilization, is preferably carried out as follows. The aqueous solution at one atmosphere pressure is rapidly cooled from about room temperature to about $-60°$ to $-64°$ C. During primary drying the pressure is reduced to 0.01 torr, and the temperature is slowly raised from $-64°$ to $-20°$ C.; as the temperature increases the pressure is allowed to rise to 0.1 torr. During secondary drying the temperature is slowly raised from $-20°$ C. to $20°$ C., and the pressure lowered from 0.1 torr to less than about 0.01 torr.

EXAMPLE 1

The resin of Example 1 is a commercially available, polyamide-epichlorohydrin, wet-strength paper resin. The resin is derived by reaction of epichlorohydrin with an adipic acid-diethylenetriamine polyamide. The resin is supplied as a $12.5 \pm 0.5\%$ aqueous solution and is characterized by a specific gravity of 1.033–1.035, a Brookfield viscosity of 60–85 cps, and a pH=4.5–4.9.

A 20 ml sample of this resin solution was flash frozen in liquid nitrogen to form a shell coating in a lyophilizer bottle. The sample was dried on a Virtis Model 10-020 bench lyophilizer at $-64°$ C., <200 mTorr, for 24 hours. A beige amorphous and friable solid was obtained which was ground to a fine powder under a nitrogen atmosphere and stored under nitrogen in a glove box.

The lyophilized resin could be reconstituted in water containing enough concentrated hydrochloric or sulfuric acid to give pH=4.5. The concentration was set at 1.1% solids to mimic the concentration in the paper mill head box and the solution was homogenized in a blender for 10 minutes.

The strength of the reconstituted resin was tested and compared with that of the original commercial resin solution. An aqueous solution of 1.1% resin is applied by size press to unbleached kraft paper and then dried. 4 in. $\times$ 1 in. specimens of treated paper were rewetted in distilled water by soaking for 1 hr, lightly blotting to absorb excess water and then tested in a tensile strength instrument. Wet strength is reported in pounds to break the test sample per inch of sample width. Dry strength is similarly measured for a treated sample that has not been rewetted. A wet-to-dry strength ratio is reported in percent.

| TEST RESULTS | Wet (lb/in) | Dry (lb/in) | Wet/Dry Ratio |
|---|---|---|---|
| Lyophilized Resin Reconstituted | 11.96 | 45.22 | 26.4% |
| Commercial resin solution | 15.6 | 48.1 | 32.3% |

The resin of this invention retained 77% of the wet strength of the original starting solution.

I claim:

1. A dry, solid, water soluble, amorphous, cationic polyamide-epichlorohydrin resin powder, the polyamide portion of said resin being the long chain reaction product of a polyalkylene polyamine having two primary amine groups and at least one secondary amine group with a member selected from the group consisting of $C_3$ to $C_8$ saturated aliphatic dicarboxylic acids and lower alkyl esters of $C_3$ to $C_8$ saturated aliphatic dicarboxylic acids, said resin having been made by the reaction of said polyamide with epichlorohydrin in an aqueous solution in which the mole ratio of epichlorohydrin to secondary amine groups of the polyamide is about 0.5 to 1 to about 1.8 to 1.

2. The resin powder of claim 1 in which the polyamide portion of the resin contains diethylenetriamine units and adipic acid units.

3. The resin powder of claim 1 in which the polyamide portion of the resin contains diethylenetriamine units and glutaric acid units.

4. The resin powder of claim 1 that is produced by freeze-drying an aqueous solution of the resin.

* * * * *